(12) United States Patent
Horii

(10) Patent No.: US 6,597,399 B2
(45) Date of Patent: *Jul. 22, 2003

(54) IMAGE PICKUP SENSOR CAPABLE OF SELECTIVELY PHOTOGRAPHING AN IMAGE PICKUP AREA IN AN INTERLACING OPERATION

(75) Inventor: Hiroyuki Horii, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 63 days.

(21) Appl. No.: 08/688,946

(22) Filed: Jul. 31, 1996

(65) Prior Publication Data

US 2003/0058359 A1 Mar. 27, 2003

(30) Foreign Application Priority Data

Aug. 2, 1995 (JP) .............................. 7-197468

(51) Int. Cl.⁷ ........................... H04N 3/14; H04N 5/335
(52) U.S. Cl. ....................... 348/308; 348/305; 348/307; 250/208.1
(58) Field of Search ................................ 348/135, 138, 348/207, 222, 229, 230, 294, 302, 303, 304, 305, 307–312, 345, 350, 207.99, 222.1, 301; 250/208.1; H04N 5/335, 5/232, 5/235

(56) References Cited

U.S. PATENT DOCUMENTS

| | | | | |
|---|---|---|---|---|
| 4,322,752 A | * | 3/1982 | Bixby | 348/312 |
| 4,430,673 A | * | 2/1984 | Salomon et al. | 348/311 |
| 4,614,975 A | * | 9/1986 | Kaite | 348/354 |
| 4,910,599 A | * | 3/1990 | Hashimoto | 348/240 |
| 4,942,473 A | * | 7/1990 | Zeevi et al. | 348/281 |
| 5,196,939 A | * | 3/1993 | Elabd et al. | 348/314 |
| 5,235,421 A | * | 8/1993 | Yang | 348/426 |
| 5,363,137 A | * | 11/1994 | Suga et al. | 348/302 |
| 5,412,422 A | * | 5/1995 | Yamada et al. | 348/218 |
| 5,541,654 A | * | 7/1996 | Roberts | 348/301 |
| 5,812,191 A | * | 9/1998 | Orava | 348/308 |
| 5,920,348 A | * | 7/1999 | Ejima | 348/341 |

FOREIGN PATENT DOCUMENTS

JP    63186466    8/1988    ........... H01L/27/14

* cited by examiner

Primary Examiner—Mgoc-Yen Vu
(74) Attorney, Agent, or Firm—Fitzpatrick, Cella, Harper & Scinto

(57) ABSTRACT

In order to select an image pickup area and execute an image pickup operation, or to perform an interlace operation, or to vary an image pickup frequency for one image pickup sensor, there is provided an image pickup apparatus constructed by a 2-dimensional solid state image pickup sensor in which pixel data instructed by horizontal and vertical shift registers is accessed and read out and a timing generator to drive the 2-dimensional solid state image pickup sensor. With respect to horizontal and vertical shift pulses which are supplied from the timing generator and drive horizontal and vertical shift registers of the 2-dimensional solid state image pickup sensor, periods of the horizontal shift pulses and/or the vertical shift pulses are made variable.

14 Claims, 7 Drawing Sheets

IMAGE PICKUP SENSOR CAPABLE OF SELECTIVELY PHOTOGRAPHING AN IMAGE PICKUP AREA IN AN INTERLACING OPERATION

BACKGROUND OF THE INVENTION

1. Field of the Invention

The present invention relates to an image pickup apparatus which inputs an image and can be applied to a camera.

2. Related Background Art

In a conventional image pickup apparatus using solid state image pickup devices such as CCDs, MOSs, or the like, as shift pulses of horizontal and vertical shift registers, shift pulses of a predetermined period are outputted in accordance with an external timing signal. The image pickup apparatus receiving light of an object to be photographed sequentially reads out the solid state image pickup devices arranged two-dimensionally one line by line of horizontal lines, outputs as a time-sequential image pickup signal, scans the line that is lower than the horizontal line in the vertical direction by one line, sequentially reads out the image pickup signals, and subsequently scans, thereby obtaining one 2-dimensional image signal, and subsequently, reads out a number of 2-dimensional image signals, so that an image pickup signal as a motion picture can be obtained.

In the above conventional apparatus, however, an image pickup area, an image pickup frequency, and the like are decided by an image pickup sensor and a driving timing of a timing generator for driving such a sensor. Therefore, there is a case where only a partial image pickup portion in the image pickup signal inputted to the image pickup apparatus is needed. In this case, ordinarily, a focal point of a lens arranged in front of the image pickup sensor is changed and the direction of the image pickup apparatus is changed to the center of the necessary image pickup portion, and an object is photographed, an image pickup range is enlarged or reduced, thereby obtaining an image pickup signal of a necessary angle of field. However, it is extremely difficult to obtain only a desired area portion without changing the operation of the lens or the direction of the apparatus and there is no more effective means for obtaining such a desired area portion. For one image pickup sensor, operations such that the sensor can be driven by an optimum driving method, an image pickup area is selected, an image is picked up, an interlacing operation is performed, an image pickup frequency is varied, and the like cannot be performed.

SUMMARY OF THE INVENTION

It is an object of the invention that in one two-dimensional image pickup sensor, an image pickup frequency is varied and its optimum driving method is provided and that an image pickup apparatus in which an image pickup area is selectively photographed and an image pickup and an image pickup signal process of an invalid area can be omitted by an interlacing operation is provided.

According to the invention, there is provided an image pickup apparatus comprising: a two-dimensional solid state image pickup sensor from which pixel data instructed by horizontal and vertical shift registers is accessed and read out; and a timing generator for driving the two-dimensional image pickup sensor, wherein with respect to horizontal and vertical shift pulses which are supplied from the timing generator and which drive the horizontal and vertical shift registers of the 2-dimensional solid state image pickup sensor, periods of the horizontal and/or vertical shift pulses can be varied.

According to the invention, there is further provided area selecting means for selecting an arbitrary area, wherein when an area selected by the area selecting means is accessed, the periods of the horizontal and vertical shift pulses are extended and the horizontal and vertical shift registers are shifted at a low speed and, when an area which is not selected by the area selecting means is accessed, the periods of the horizontal and vertical shift pulses are reduced, the shift registers are shifted at a high speed, and the above operations are repeated at every vertical period.

According to the invention, there is further provided sampling and holding means for sampling and holding an output signal of the 2-dimensional solid state image pickup sensor, wherein when the area selected by the area selecting means is accessed, a sampling and holding pulse is inputted to the sampling and holding means and, when the area which is not selected by the area selecting means is accessed, the sampling and holding pulse is not inputted to the sampling and holding means.

The invention is characterized in that a plurality of periods of the horizontal and/or vertical shift pulses are prepared, among m horizontal shift pulses, n pulses (m denotes an integer that is equal to or larger than 1 and is equal to or less than the number of pixels of one line, n denotes an integer that is equal to or larger than 1 and is equal to or less than m) are set to pulses each having a long period and (m−n) pulses (including 0 pulse) are set to pulses each having a period shorter than that of the above n pulses, and among k vertical shift pulses, l pulses (k denotes an integer which is equal to or larger than 1 and is equal to or less than the number of lines of one picture plane, l denotes an integer which is equal to or larger than 1 and is equal to or less than k) are set to pulses each having a long period and (k−l) pulses (including 0 pulse) are set to pulses each having a period shorter than that of. the above l pulses, and the above-mentioned pulses are inputted to the 2-dimensional solid state image pickup sensor.

The invention is further characterized in that a plurality of periods of the horizontal and/or vertical shift pulses are prepared, among m horizontal shift pulses, n pulses (m denotes an integer that is equal to or larger than 1 and is equal to or less than the number of pixels of one line, n denotes an integer that is equal to or larger than 1 and is equal to or less than m) are set to pulses each having a long period and (m−n) pulses (including 0 pulse) are set to pulses each having a period shorter than that of the above n pulses, and among k vertical shift pulses, l pulses (k denotes an integer that is equal to or larger than 1 and is equal to or less than the number of lines of one picture plane, l denotes an integer that is equal to or larger than 1 and is equal to or less than k) are set to pulses each having a long period and (k−l) pulses (including 0 pulse) are set to pulses each having a period shorter than that of the above l pulses, and further, when the period of the vertical shift pulse is short, the horizontal shift pulse is not inputted.

According to the invention, there is further provided sampling and holding means for sampling and holding an output signal of the 2-dimensional solid state image pickup sensor, wherein a plurality of periods of the horizontal and/or vertical shift pulse are formed, among m horizontal shift pulses, n pulses (m denotes an integer that is equal to or larger than 1 and is equal to or less than the number of pixels of one line, n denotes an integer that is equal to or larger than 1 and is equal to or less than m) are set to pulses each having a long period, a sampling and holding pulse is inputted to the sampling and holding means, (m−n) horizontal shift pulses (including 0 pulse) are set to pulses each having a period shorter than that of the above n pulses, and the sampling and holding pulse is not inputted to the sampling and holding means.

The above and other objects and features of the present invention will become apparent from the following detailed description and the appended claims with reference to the accompanying drawings.

DETAILED DESCRIPTION OF THE PREFERRED EMBODIMENTS

Figure 1B:
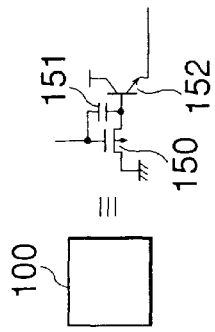
FIG. 1B is an equivalent circuit diagram of a light receiving section.
Figure 1A:
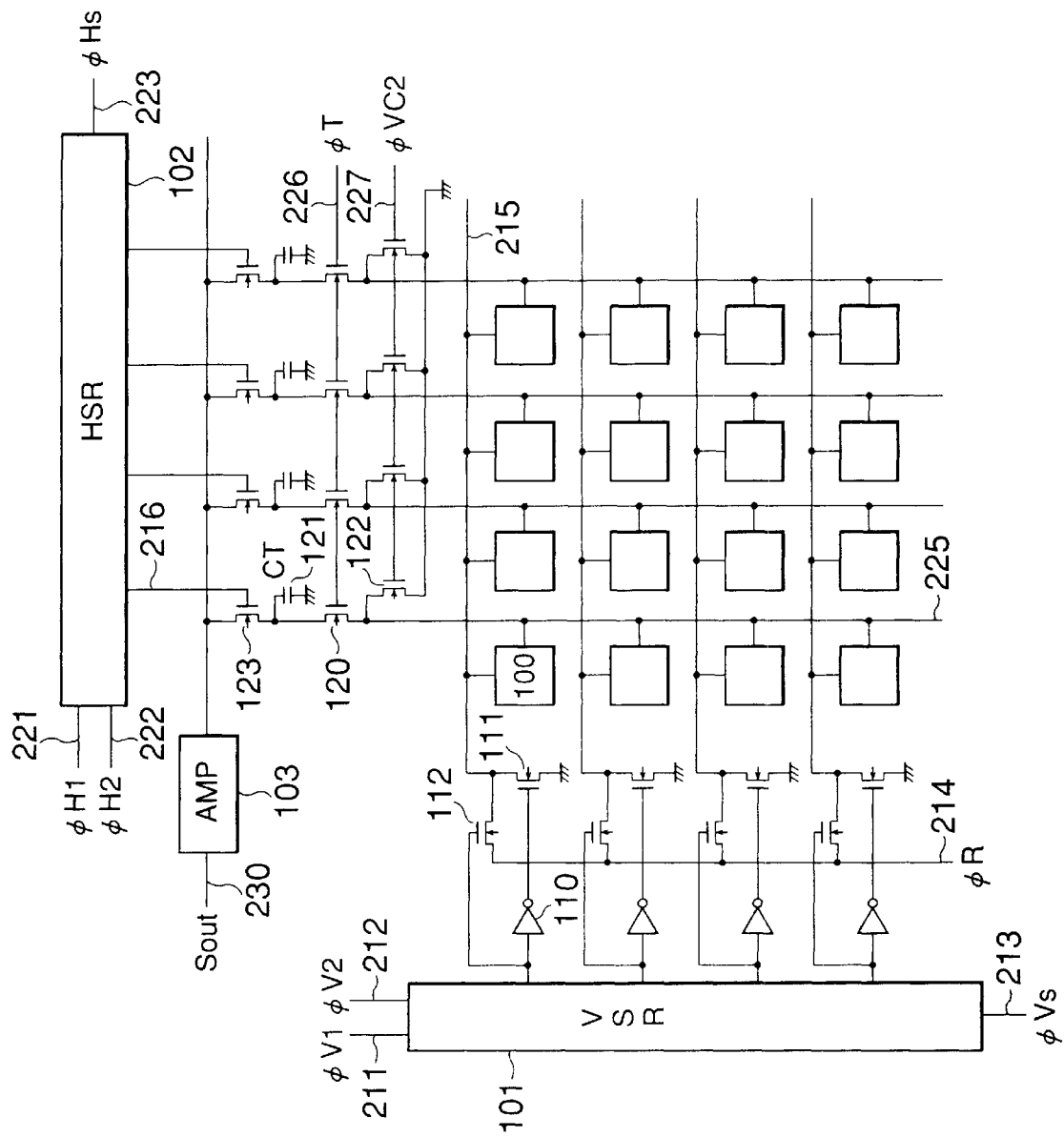
FIG. 1A is an inner block diagram (of 4×4 pixels) of a BASIS image pickup sensor as an embodiment of the invention.
Figure 2:
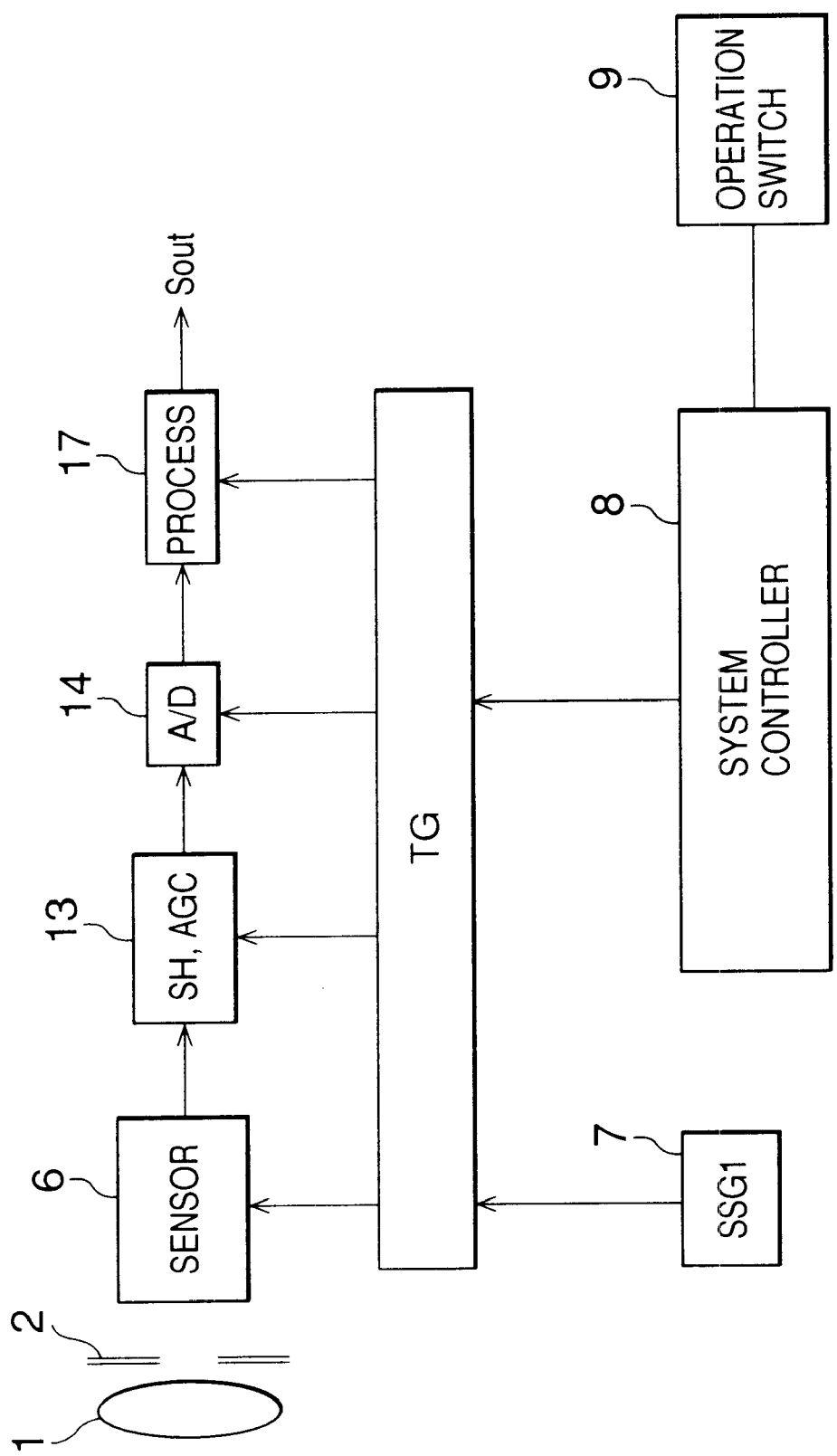
FIG. 2 is a block diagram of an image pickup apparatus including an image pickup sensor.

FIGS. 1A and 1B show an embodiment of a part of an image pickup sensor of the invention. FIG. 2 shows a block diagram of a camera as an image pickup apparatus using the image pickup sensor.

In FIGS. 1A and 1B, explanation will now be made with respect to an example in which a BASIS (Base Stored Image Sensor) for accumulating photo carriers according to a luminous intensity into a base of a transistor is used as an image pickup sensor. That is, the BASIS is a sensor characterized in that carriers generated in a base of a bipolar transistor formed in each pixel are read out by an emitter-follower operation of a capacitive load. The BASIS has been disclosed in JP-A-63-186466, JP-A-63-186466 and the like.

In FIG. 1A, reference numeral 100 denotes a light receiving portion of each pixel by the BASIS; 102 a horizontal shift register (HSR); 101 a vertical shift register (VSR); 103 an output amplifier (AMP); 110 an inverter for inverting an output of the vertical shift register 101; 111 an nMOS transistor for driving the first horizontal line; 112 an nMOS transistor for driving the second horizontal line; 120 an nMOS transistor for a vertical transfer; 121 an accumulating capacitor CT for temporarily accumulating photo carriers; 123 an nMOS transistor for outputting which is turned on/off by a scanning signal from the φV2 for driving the vertical shift register 101; 213 a start pulse φVs of the vertical shift register 101; 214 a horizontal driving pulse φR; 215 a horizontal driving line of each horizontal line; 221 and 222 driving pulses φH1 and φH2 for driving the horizontal shift register 102; 223 a start pulse φHs of the horizontal shift register 102; 225 a vertical read-out line of each vertical line; and 230 an output signal line of the output amplifier 103.

FIG. 1B shows the details of the light receiving portion 100 of each pixel. In the diagram, reference numeral 150 denotes a p-type MOS transistor; 151 a driving capacitor; and 152 a bipolar transistor. In the light receiving portion 100, carriers generated in a base of the bipolar transistor 152 are outputted from an emitter to the accumulating capacitor 121 through the vertical read-out line 225. The base carriers are first reset by a turn-on of the p-type MOS transistor 150, the photo carriers are accumulated in the base for a predetermined time, and the bipolar transistor 152 is turned on by a high-level signal of the horizontal line 215 through the driving capacitor 151, so that photo charges according to the photo carriers accumulated in the base of the bipolar transistor 152 are outputted through the emitter.

Although FIGS. 1A and 1B show a portion of (4×4) pixels of the image pickup sensor, since a finer image pickup signal of a high precision and a high quality of (768×494) pixels, (1536×988) pixels, or the like is actually demanded, the number of pixels is more and more increasing, so that the invention is extended and applied.

In FIGS. 1A and 1B, the charges accumulated in each light receiving portion 100 are read out as follows. First, the vertical start pulse 213 is inputted to the vertical shift register 101, the register in the vertical shift register 101 sequentially shifts a high-level signal by the vertical shift register driving pulses 211 and 212 of the vertical shift register 101, an output of the register 101 is inverted by the inverter 110 in accordance with the shifted H level signal, the nMOS transistor 111 which is ordinarily in the ON state is turned off, the nMOS transistor 112 is turned on, an electric potential of the horizontal driving pulse 214 is applied to the horizontal driving lines 215 from the first line, so that the horizontal driving line is sequentially driven to the high level. When the horizontal driving line 215 is driven, the light receiving portion 100 connected to the line 215 enters a reading mode and outputs a signal according to the accumulated light amount to the vertical read-out line 225. When the charges accumulated in the light receiving portion 100 are outputted to the vertical read-out line 225, a transfer pulse φT 226 is set to the high level, the nMOS transistor 120 for a vertical transfer is turned on, and the charges are transferred to the accumulating capacitors CT 121, respectively.

When the charges accumulated in the light receiving portion 100 of one horizontal line are transferred to the accumulating capacitor CT 121, the transfer pulse 226 is set to the low level and the nMOS transistor 120 for vertical transfer is turned off. Subsequently, a reset pulse φVC2 227 is set to the high level, the nMOS transistor 122 for resetting is turned on, and the charges of the light receiving portion 100 are reset. In this instance, the nMOS transistors 123 for outputting are sequentially turned on by a driving signal 216 from the horizontal shift register 102 and light reception charges of one line transferred to the accumulating capacitor 121 are outputted to the output signal line 230 through the output amplifier 103.

After the signal of one line was read out, the transfer pulse 226 and resetting pulse 227 are again turned on, and the nMOS transistor 120 for vertical transfer and nMOS transistor 122 for resetting are turned on, thereby resetting the accumulating capacitor 121.

In FIGS. 1A and 1B, although the operation of the image pickup sensor has been explained by using the example of the BASIS sensor, the invention can be applied to not only the BASIS sensor but also a general 2-dimensional solid state image pickup sensor such as MOS-type sensor, CCD sensor, or the like.

FIG. 2 is a block diagram of an image pickup apparatus using the image pickup sensor shown in FIGS. 1A and 1B.

In FIG. 2, reference numeral 1 denotes a lens for receiving a light from an image pickup object; 2 a diaphragm for adjusting a light amount; 6 an image pickup sensor (Sensor); 7 a synchronization signal generator (SSGI); 8 a system controller (System Controller); 9 an operation switch (Operation Switch); 12 a timing generator (TG); 13 a sampling and holding circuit (SH, AGC); 14 an A/D converter (A/D); and 17 a signal processing circuit (process).

In the image pickup apparatus in FIG. 2, a synchronization signal generated from the synchronization signal generator 7 is inputted to the timing generator 12. A timing signal for driving the image pickup sensor 6 is generated by the timing generator 12. The timing signal is inputted to the horizontal shift register or vertical shift register of the image pickup sensor 6, so that the image pickup sensor 6 is driven. From the optical image which passed through the lens 1 and diaphragm 2 and was formed on the image pickup sensor 6, the image pickup signal according to the amount of light received every pixel of each image pickup sensor 6 is sequentially read out in accordance with the timing signal generated by the timing generator 12. The image pickup signal is sampled and held by the sampling and holding circuit 13 in accordance with the timing signal. The analog image pickup signal is converted into a digital signal by the A/D converter 14. The digital signal is subjected to processes such as correction of a variation in sensitivity of the image pickup sensor, clamping for a black level correction, shading correction by the signal processing circuit 17, so that the resultant signal is outputted as an output signal.

In this instance, a command is generated to the timing generator 12 through the system controller 8 in accordance with a read-out area and a reading method designated by the operation switch 9. In accordance with the command, the timing generator 12 generates the pulses for driving the horizontal and vertical shift registers in order to drive the image pickup sensor 6, namely, first outputs the start pulses φHs and φVs and subsequently generates the driving pulses φH1, φH2, φV1, and φV2. The reading operation of the optical image described in FIG. 1 is performed by those start pulses and driving pulses.

FIGS. 3 to 6 show timing charts for the driving pulses φV1 211 and φV2 212 and start pulse φVs 213 of the vertical shift register 101, driving pulses φH1 221 and φH2 222 and start pulse φHs 223 of the horizontal shift register 102, sampling and holding pulse (SHP), and the like.

Figure 3:
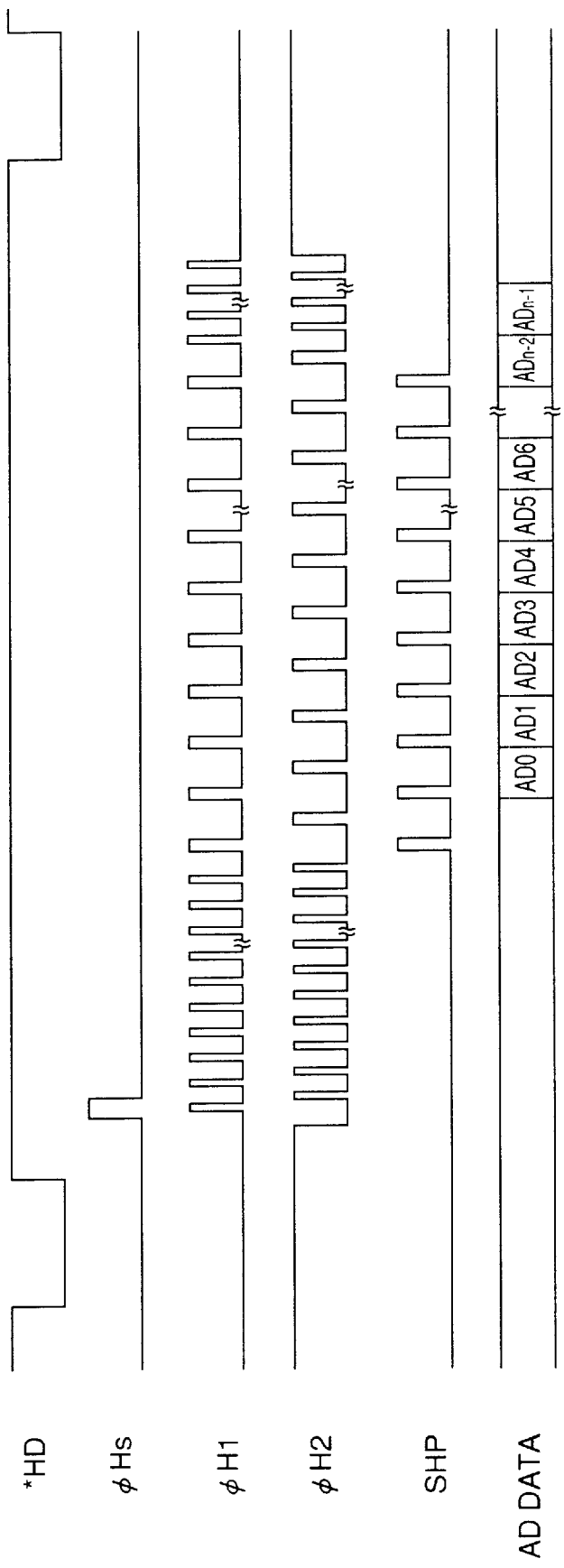
FIG. 3 is a timing chart for shift pulses which are supplied to a horizontal shift register and a sampling and holding pulse when reading out a specific area in the embodiment according to the invention.

FIG. 3 shows an embodiment of the pulse for driving the horizontal shift register when reading out only a part of the image pickup area of the image pickup sensor 6. A horizontal period signal (*HD) is generated from the timing generator 12 in accordance with a predetermined horizontal frequency at a period of 17.5 kHz, in case of, for example, an NTSC video signal. In an unnecessary area which is not read out in the optical image inputted from the lens 1 and diaphragm 2, the horizontal shift register is driven at a high speed for a short period, thereby shifting the driving pulses φH1 221 and φH2 222 at a high speed from a time point of the input of the start pulse φHs 223. In the input optical image, as for the area to be read out, the image pickup sensor is driven at a period which is relatively slow and in which the sampling can be sufficiently performed. Further, a sampling and holding pulse SHP is outputted to only the area to be read out. Thus, only the output which was sampled and held is A/D converted to digital data (AD data).

In this instance, the number of pulses are set as follows. Namely, the number of pulses of a long period is equal to the number of horizontal pixels according to the read-out area. The number of pulses of a short period which are generated for a time interval until the pulses of a long period after the horizontal period signal (*HD) is equal to the number of pulses (the number of idle transmission pulses) which are necessary to progress the horizontal shift register to the horizontal start coordinate of the read-out area. The pulses of a short period after the read-out pulses of a long period (after the timing signal for data of ADn−1 was inputted) are pulses to sweep out the read-out pulses which remain in the horizontal shift register. Since the image pickup signal of the area according to the command is read out at a long period, the fine and correct image pickup signal can be obtained, so that the image pickup signal of a correct light amount and a high quality can be obtained as compared with the other unnecessary area of a short period.

Figure 4:
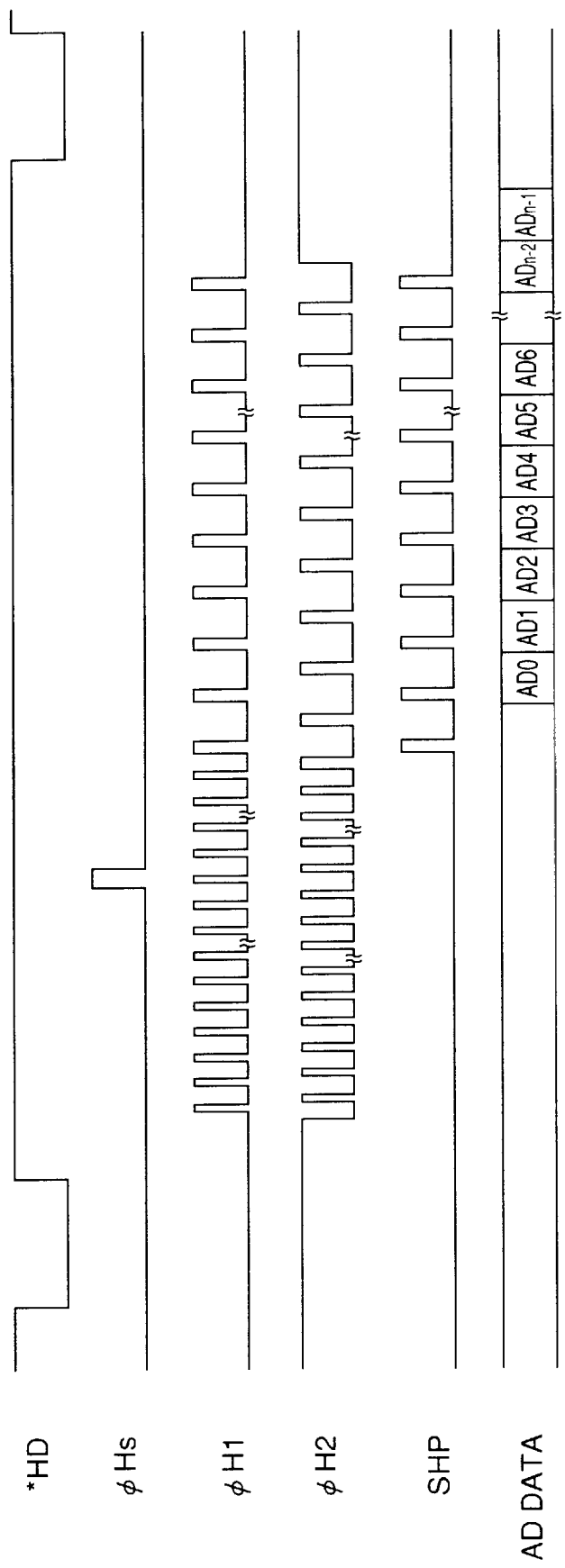
FIG. 4 is a timing chart for the shift pulses which are supplied to the horizontal shift register and the sampling and holding pulse when reading out a specific area in the embodiment according to the invention and shows a modification of FIG. 3.

FIG. 4 is a modification of FIG. 3, relates to the pulses 221 and 222 for driving the horizontal shift register, and shows another embodiment of the timing chart which is divided into a high-speed transfer portion (former half portion) of a short period and a low-speed reading portion (latter half portion) of a long period. In this case, by inserting the horizontal shift register start pulse φHs 233 to an arbitrary position of the high-speed transfer portion (former half portion), the pulses of the number (the number of idle transmission pulses) necessary to progress the horizontal shift register 102 to the horizontal start coordinate of the read-out area can be transmitted in an idle state. That is, in the high-speed transfer portion, the horizontal shift register start pulse φHs 223 is inputted and the pulses up to the low-speed reading portion becomes the pulses of the number (the number of idle transmission pulses) necessary to progress the horizontal shift register up to the horizontal start coordinate of the read-out area. The pulses of the high-speed transfer portion until the horizontal shift register start pulse 223 is inputted are pulses to sweep out the reading pulses which remain in the horizontal shift register in the line of one line before.

Figure 5:
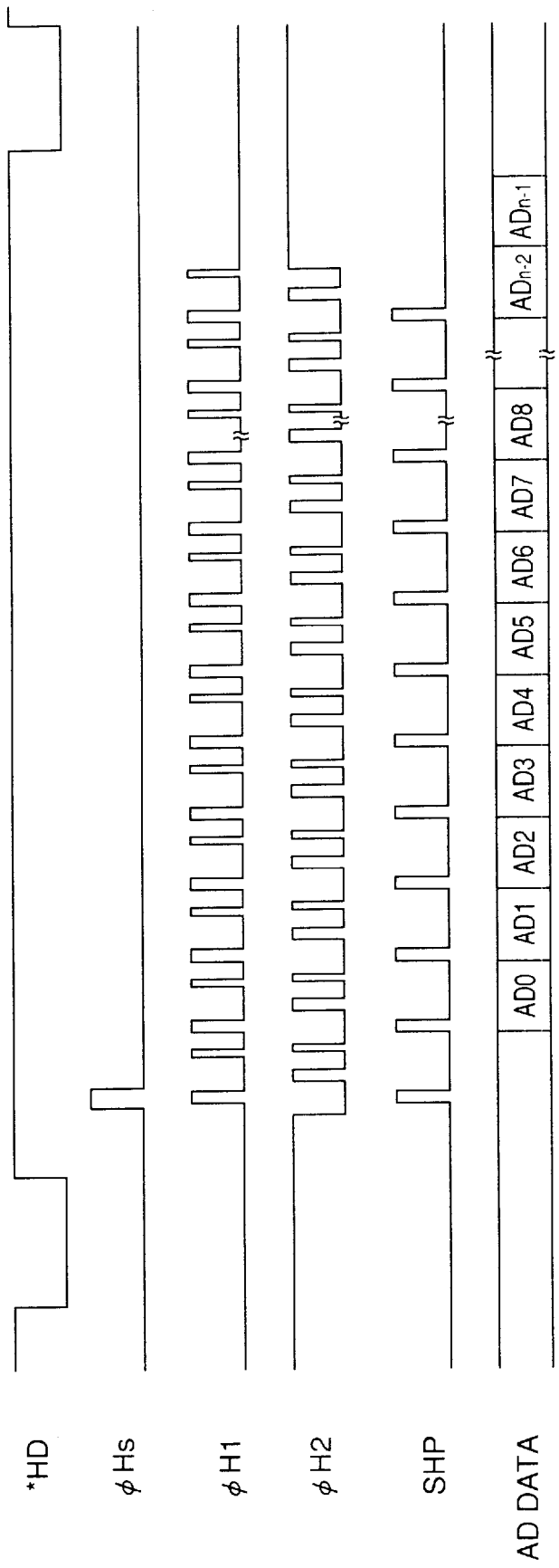
FIG. 5 is a timing chart for the shift pulses which are supplied to the horizontal shift register and the sampling and holding pulses when performing an interlace scanning in the embodiment according to the invention.

FIG. 5 shows another embodiment of the timing chart of the pulse φH1 221 for driving the horizontal shift register and driving pulse φH2 222 to perform an interlace reading every pixel. That is, by reading out the signal every pixel, the read-out data is set to 1/2, so that the data amount is reduced to 1/2. For example, when an amount of coarse transmission data is reduced, this method is effective to the transmission of the image pickup signal by, for example, a telephone line for a television conference. In this instance, the pulses of a long period and the pulses of a short period are alternately inputted to the horizontal shift register 102 of the image pickup sensor 6, thereby controlling the reading operation by the image pickup sensor 6. In this case as well, only when the output signal is read out from the image pickup sensor 6 (namely, at the time of the pulses of a long period), the sampling and holding pulse (SHP) is outputted and A/D converted and the resultant data is outputted as AD data.

In this instance, although the example of the reading-out of every pixel has been shown, this method can be also applied to a case of scanning every two pixels or every plural pixels. Consequently, a transmission data amount can be extremely reduced and as a light reception signal of each detection pixel, in addition to an accuracy of the sampling and holding, a value having a good S/N ratio of a high sensitivity can be obtained.

Figure 6:
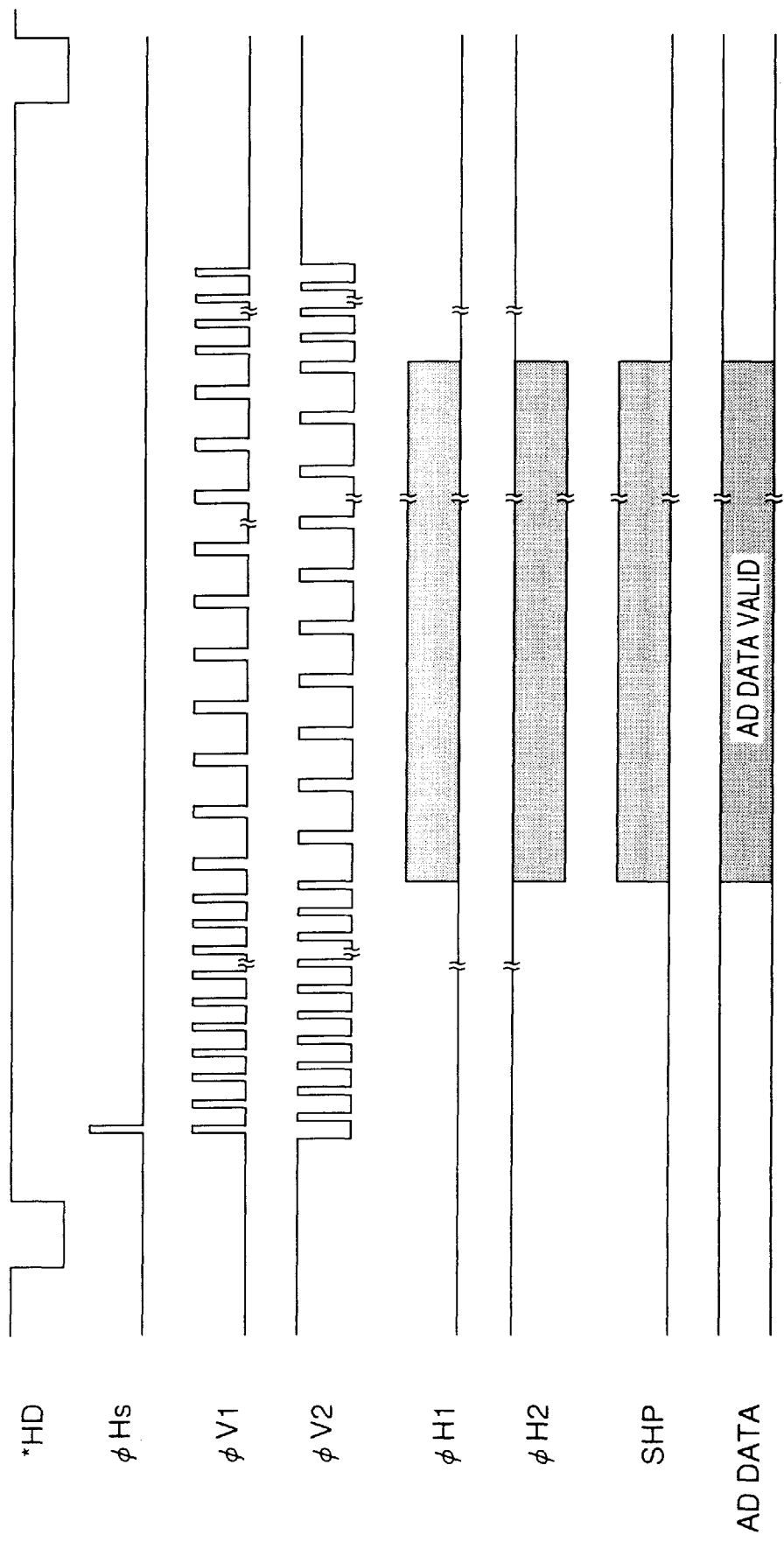
FIG. 6 is a timing chart for shift pulses which are supplied to the horizontal and vertical shift registers and a sampling and holding pulse when reading out a specific area in the embodiment according to the invention.

FIG. 6 is a timing chart when reading out only a part of the image pickup area of the image pickup sensor 6 in a manner similar to FIG. 3 and shows another embodiment of the timing chart of the pluses φV1 and φV2 for driving the vertical shift register. In an unnecessary area which is not read out in the vertical area, since it is unnecessary to read out the signal from the image pickup sensor 6, the vertical shift register 101 is driven at a high speed at a short period and the pulses in the vertical shift register 101 are shifted. The timing signal to the horizontal shift register 102 and samplling and holding pulse SHP are inputted as for the area to be read out as usual. At the time of the interlace scanning in the interlace scan driving, similarly, a combination of the high-speed shift pulses in the read-out unnecessary area and the low-speed shift pulses in the read-out area are used.

Figure 7:
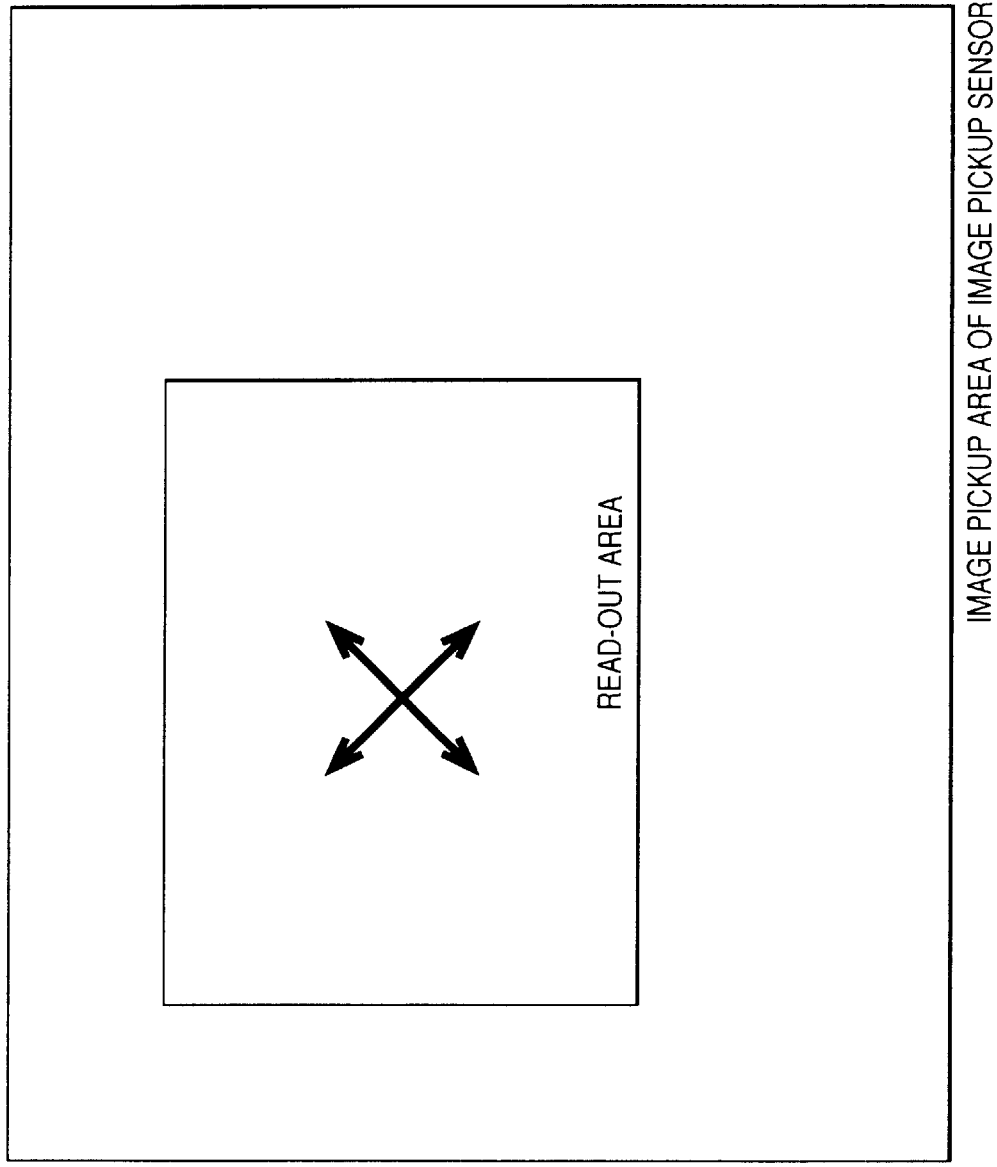
FIG. 7 is a diagram showing an image pickup area of an image pickup sensor and a specific read-out area in the embodiment according to the invention.

FIG. 7 is a diagram showing the image pickup area which the image pickup sensor has and a specific read-out area which have been described above. An outer frame denotes the image pickup area of the image pickup sensor and an inner frame denotes the read-out area. The inner read-out area can be moved to an arbitrary area in the image pickup area by designating from the operation switch 9. The outside of the read-out area denotes an unnecessary area which is skipped by a high-transfer pulse.

As mentioned above, the read-out area is specified and an output signal read out from the read-out area is converted to a signal of, for example, a predetermined image frame and is converted to an image signal to be expanded to one whole image or the signal of only the read-out area is transmitted to the outside, so that it is also effective to reduce a data amount.

In the above embodiment, the example in which the reading period of time of the image pickup sensor is changed for the designated area and the unnecessary area has been shown. However, even when there are a plurality of designated areas or the designated area has any shape such as triangle, rectangle, circle, or the like such a change in reading period can be accomplished by generating the pulses of a long period in the designated area and the pulses of a short period in the unnecessary area as timing signals of the timing generator 12 by an instruction of the system controller 8. Even when the designated area is moved, by changing the timing signals to the horizontal and vertical shift registers, such a change in reading period can be accomplished in a manner similar to the above.

In each of the embodiments, when the horizontal scanning frequency and vertical scanning frequency are set to the normal frequencies by a command which is generated from the operation switch 9 and which is used to read out a predetermined area and a plurality of periods of the horizontal and/or vertical shift pulses are prepared, on the horizontal axis, among m horizontal shift pulses, n pulses (m denotes an integer which is equal to or larger than 1 and is equal to or less than the number of pixels of one line, n denotes an integer which is equal to or larger than 1 and is equal to or less than m) are set to pulses each having a long period and the signal of the optical image of the designated area is accurately outputted and (m−n) pulses (including 0 pulse in case of the whole optical image) are set to pulses each having a period shorter than that of the above n pulses. On the vertical axis, among k vertical shift pulses, l pulses (k denotes an integer that is equal to or larger than 1 and is equal to or less than the number of vertical lines of one picture plane, l denotes an integer that is equal to or larger than 1 and is equal to or less than k) are set to pulses each having a long period and (k−l) pulses (including 0 pulse) are set to pulses each having a period shorter than that of the above k pulses. Those pulses are inputted to the 2-dimensional solid state image pickup sensor in order to perform a scanning of a predetermined area. As an output of the image pickup sensor, the charges according to the photo carriers accumulated in each image pickup device can be read out at a long period with respect to the necessary areas of the horizontal and vertical lines and at a short period with regard to the unnecessary area.

Similarly, a plurality of periods of the horizontal and/or vertical shift pulses are prepared. Among m horizontal shift pulses, n pulses (m is an integer that is equal to or larger than 1 and is equal to or less than the number of pixels of one line, n is an integer which is equal to or larger than 1 and is equal to or less than m) are set to pulses of a long period and (m−n) pulses (including 0 pulse) are set to pulses of a period shorter than that of the n pulses as an insensitive area. Among k vertical shift pulses, l pulses (k is an integer that is equal to or larger than 1 and is equal to or less than the number of lines of one picture plane, l is an integer which is equal to or larger than 1 and is equal to or less than k) are set to pulses of a long period, thereby accurately detecting a sensitive area. (k−l) pulses (including 0 pulse) are set to pulses of a period that is shorter than that of the l pulses. Further, when the period of the vertical shift pulses is short, by preventing that the horizontal shift pulse is inputted, the horizontal scan is turned off within an unnecessary vertical scanning range and an electric power consumption in a vain area of the shift register is reduced, thereby realizing an efficient scan.

At a point to sample and hold the output signal of the 2-dimensional solid state image pickup sensor, the operation of the sampling and holding circuit in the unnecessary area is turned off.

In the embodiment, although specific numerical values of the long period of the designated area and the short period of the unnecessary area are not shown, for example, if they are shown by a ratio of 2:1, a pixel accumulating time that is twice as long as the ordinary one is assured for the area of the long period, so that an image pickup signal having a good S/N ratio can be obtained. The image pickup signal of a high quality can be sampled and held at a long period. An accurate A/D conversion of small noises can be performed. The digital signal can be obtained at a high resolution. In the signal processes after the next stage, an erroneous operation can be reduced by, for example, a signal compression and decompression or the like.

In the 2-dimensional solid state image pickup sensor in which the pixel data instructed by the horizontal and vertical shift registers by the operation switch is accessed and is read out, with respect to the horizontal and vertical shift pulses to drive the horizontal and vertical shift registers of the 2-dimensional solid state image pickup sensor, the periods of the horizontal and/or vertical shift pulses are made variable, so that pixels can be read out from an arbitrary area in the image pickup area of the 2-dimensional solid state image pickup sensor. The period of the shift pulse of the shift register is reduced, the unnecessary area is shifted at a high speed, and the signal with less noises is certainly outputted by the shift pulse of a long period from the read-out area. Further, in the sampling and holding circuit at the post stage, the sampling and holding operation is made easy. In the unnecessary area, similarly, since there is no need to perform processes at the post stage, the sampling and holding operation at the post stage, the sampling and holding operation is not executed and no sampling and holding pulse is generated. As shown in FIG. 3, the transfer area is divided into the high-speed transfer portion and the low-speed reading portion and the start pulse of the shift register can be inserted to an arbitrary position. Therefore, the positions of the main signal read out for the synchronization signal, sampling and holding pulse, and its output signal are fixed, so that the circuit of the shift pulse generating unit can be simplified. The sampling and holding pulse and the processing circuit at the post stage can be realized without needing the load circuit. An arbitrary area can be scanned cheaply.

By intermittently inputting the pulses of a long period and the pulses of a short period as horizontal and vertical shift register driving pulses, the interlace operations in the horizontal and vertical directions can be performed. In this instance, when interlacing the vertical line, no horizontal shift pulse is inputted, so that the vertical interlace can be executed at a high speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    a light receiving area including a plurality of photoelectric conversion portions;
    shift register, arranged for reading out a signal from said photoelectric conversion portions;
    an operation switch for instructing to select a predetermined area in said light receiving area and to change the position of the predetermined area, the predetermined area being smaller than the light receiving area; and
    a system controller for controlling said shift register according to an instruction of said operation switch so as to output pulses of different frequencies therefrom, wherein said different frequencies include a first frequency and a second frequency, the second frequency being higher than the first frequency and a pulse duration of the first frequency being broader than the pulse duration of the second frequency.

2. An apparatus according to claim 1, further comprising:
    a sample and hold circuit for sampling and holding an output signal from said photoelectric conversion area,
    wherein said system controller controls a sample and hold pulse so that the sample and hold pulse is not input into said sample and hold circuit while the pulse of the second frequency is input into the light receiving portions in the area other than the predetermined area.

3. An apparatus according to claim 1, wherein said light receiving area includes an amplifier transistor for amplifying and outputting a photoelectrically converted signal.

4. An apparatus according to claim 1, wherein said light receiving area has a MOS-type structure.

5. An apparatus according to claim 1, further comprising a change unit adapted to change the position of the predetermined area.

6. An apparatus according to claim 5, wherein said change unit changes the center of gravity of the predetermined area.

7. An image pickup apparatus comprising:
    a light receiving area including a plurality of photoelectric conversion portions arranged two-dimensionally;
    a vertical shift register for reading out a signal from said photoelectric conversion portions in a vertical direction;
    a horizontal shift register, arranged for reading out the signal read out by said vertical shift register, in a horizontal direction;
    an operation switch for instruction to select a predetermined area in said light receiving area and to change the position of the predetermined area, the predetermined area being smaller than the light receiving area; and
    a system controller for controlling said vertical shift register according to an instruction of said operation switch so as to output pulses of different frequencies therefrom, wherein said different frequencies include a first frequency and a second frequency, the second frequency being higher than the first frequency and a pulse duration of the first frequency is broader than the pulse duration of the second frequency.

8. An apparatus according to claim 7, further comprising:
    a sample and hold circuit for sampling and holding an output signal from said photoelectric conversion area,
    wherein said system controller controls a sample and hold pulse so that the sample and hold pulse is not input into said sample and hold circuit while the pulse of the second frequency is input into the light receiving portions in the area other than the predetermined area.

9. An apparatus according to claim 7, wherein said system controller controls said horizontal shift register so that said horizontal shift register does not output a pulse while said vertical shift register supplies the pulse to the photoelectric conversion portions in the area other than the predetermined area.

10. An apparatus according to claim 7, further comprising a change unit adapted to change the position of the predetermined area.

11. An apparatus according to claim 10, wherein said change unit changes the center of gravity of the predetermined area.

12. An image pickup apparatus comprising:
    a light receiving area including a plurality of photoelectric conversion portions;
    a readout circuit arranged for reading out a signal from said plurality of photoelectric conversion portions; and
    a system controller arranged for effecting control so that when an image is formed by using a photoelectric conversion signal provided from said light receiving area every other photoelectric conversion portion or every plural photoelectric conversion portions, said readout circuit outputs pulses in such a manner that a pulse having a pulse duration longer than that of another pulse is output every other pulse or every predetermined number of pulses,
    wherein the pulse having the longer pulse duration is used for reading out the signal to be used to form the image from said plurality of photoelectric conversion portions.

13. An apparatus according to claim 12, further comprising:
    a sample-hold circuit arranged for sampling and holding the signal from said light receiving area; and
    an analog-digital conversion circuit arranged for converting a signal from said sample-hold circuit into a digital signal;
    wherein said system controller controls said sample-hold circuit so that the signal from the photoelectric conversion portion, which is to be used to form the image, is sampled and held and the signal from the photoelectric conversion portion, which is not to be used to form the image, is not sampled and held.

14. An apparatus according to claim 12, further comprising:
    a common output line arranged for outputting signals from said plurality of photoelectric conversion portions; and
    a plurality of transistors arranged for reading out the signals of said plurality of photoelectric conversion portions to said common output line,
    wherein said plurality of transistors are connected to said common output line, and
    wherein said read-out circuit sequentially outputs the pulses to said plurality of transistors.

* * * * *

UNITED STATES PATENT AND TRADEMARK OFFICE
CERTIFICATE OF CORRECTION

PATENT NO. : 6,597,399 B2
DATED : July 22, 2003
INVENTOR(S) : Hiroyuki Horii

It is certified that error appears in the above-identified patent and that said Letters Patent is hereby corrected as shown below:

Column 2,
Line 34, "of." should read -- of --.

Column 3,
Line 54, "JP-A-63-186466" (second occurrence) should be deleted.

Column 7,
Line 7, "samplling" should read -- sampling --.

Column 10,
Line 32, "portions," should read -- portion, --.

Signed and Sealed this

Thirteenth Day of January, 2004

JON W. DUDAS
*Acting Director of the United States Patent and Trademark Office*